United States Patent [19]

Abdous et al.

[11] Patent Number: 5,577,210
[45] Date of Patent: Nov. 19, 1996

[54] REMOTE BOOTING OF AN OPERATING SYSTEM BY A NETWORK

[75] Inventors: Arave Abdous, Massy; Stéphane Demortain, Palaiseau; Didier Dalongville, Gometz Le Chatel, all of France

[73] Assignee: Bull S.A., Paris, France

[21] Appl. No.: 75,578

[22] PCT Filed: Oct. 15, 1992

[86] PCT No.: PCT/FR92/00977

§ 371 Date: Jun. 16, 1993

§ 102(e) Date: Jun. 16, 1993

[87] PCT Pub. No.: WO93/08527

PCT Pub. Date: Apr. 29, 1993

[30] Foreign Application Priority Data

Oct. 17, 1991 [FR] France .................. 91 12837

[51] Int. Cl.⁶ .................................. G06F 9/445
[52] U.S. Cl. .................... 395/200.1; 395/200.2; 395/438; 395/894; 364/280.2; 364/975.2
[58] Field of Search ............... 395/200, 400, 395/200.09, 200.10, 200.11, 200.2, 404, 438, 439, 894; 364/280.23, 248.1, 280.2, 280.3, 280.6, 975.2

[56] References Cited

U.S. PATENT DOCUMENTS

| | | | |
|---|---|---|---|
| 4,752,870 | 6/1988 | Matsumura | 364/DIG. 1 |
| 4,958,278 | 9/1990 | Meguro | 364/200 |
| 5,109,484 | 4/1992 | Hughes et al. | 364/280.2 |
| 5,230,052 | 6/1993 | Dayan et al. | 395/700 |
| 5,280,627 | 1/1994 | Flaherty et al. | 395/700 |
| 5,305,457 | 4/1994 | Takida et al. | 395/700 |
| 5,367,688 | 11/1994 | Croll | 395/700 |
| 5,421,009 | 5/1995 | Platt | 395/200.1 |
| 5,444,850 | 8/1995 | Chang | 395/200.1 |

FOREIGN PATENT DOCUMENTS

| | | |
|---|---|---|
| 0106213 | 4/1984 | European Pat. Off. . |
| 0290924 | 11/1988 | European Pat. Off. . |
| 0358292 | 3/1990 | European Pat. Off. . |
| 2231180 | 11/1990 | United Kingdom . |

OTHER PUBLICATIONS

IBM Technical Disclosure Bulletin; "Shared Folders Between a Host and PC"; Jan. 1989; vol. 31, No. 8; pp. 428–429.

*Primary Examiner*—Meng-ai T. An
*Assistant Examiner*—Mark H. Rinehart
*Attorney, Agent, or Firm*—Kerkam, Stowell, Kondracki & Clarke, P.C.; Edward J. Kondracki

[57] ABSTRACT

A method for remote booting by a server of at least one terminal, including a volatile memory (RAM), at least one processor, a telecommunications card enabling connection to the server by a network, said server being provided with telecommunication device and memory of sufficient capacity to store the communications protocol, the operating system of the terminals recopied into an image file, its own operating system, and the applications programs, wherein the method includes the remote loading of a startup program by transforming the first interruption produced by a terminal following its being powered up into a request for reading an image file memorized in the server.

13 Claims, 3 Drawing Sheets

REMOTE BOOTING OF AN OPERATING SYSTEM BY A NETWORK

FIELD OF THE INVENTION

The present invention relates to a method and an apparatus for remote booting of an operating system through a network.

BACKGROUND OF THE INVENTION

As evidenced by British Patent Application 2,231,180, it is known to boot a first computer, connected to a second computer through a network, by loading a subsystem of the operating system into the memory of the first computer, the subsystem including the commands enabling file copying, the creation of a directory, disk formatting, and the operation of a connection through the network so that this first subsystem can then be used to transfer all the files of the operating system from the second computer to the disk of the first computer. This method has the disadvantage of requiring an initial loading of a subsystem of the operating system into the memory. A further disadvantage is that this method requires the presence of a magnetic peripheral, such as a hard disk or a diskette reader, in the first computer into which the operating system is to be loaded. Such a procedure is especially incompatible with remote booting of terminals, which must be done very fast.

U.S. Pat. No. 4,958,278 discloses a method for loading data or programs into a plurality of terminals. These terminals are not provided with a disk reader. Once a loading request is sent by one of the stations that has just been turned on, the server sends the first frame, waits for acknowledgement, and upon receiving the acknowledgement sends the subsequent frames. If some other terminal sends a loading request in the course of transmission of the frames corresponding to the loading of a first station, then the second station will take into account the frames sent to the first station, by noting in a table the fact that it is missing the first frames received by the first station. Each station must send its acknowledgement after the transmission of one frame. Once all the frames have been sent to the first station, the stations that logged onto the network later receive the first frames, which they had not initially received because they were connected after the first frame had been sent to the first station. In this method, it is the server that memorizes the number of the first frame that a second station in the network receives at the moment that station appears, and that at the end of loading the first station connected sends the other station the frames that it had not been able to receive. This method requires each station to send its own acknowledgement, which requires time to transmit the various acknowledgements for each station, to prevent collisions. This introduces a delay between the end of transmission of one frame and the transmission of the next frame. This delay must either be variable as a function of the number of the stations connected, or must be calculated to correspond to the maximum configuration.

However, this method and apparatus permit only a fixed kind of operation by a predetermined remote booting program that performs the loading of a fixed application once and for all.

SUMMARY OF THE INVENTION

One object of the invention is to propose a method for loading terminals that may not include a disk or diskette unit and that makes it possible, for a standard terminal architecture using the standard PC operating system (MS-DOS), to load all the applications or files that may be desired later.

This object is attained by providing a method for remote booting by a server of at least one terminal, including a volatile memory (RAM), at least one processor, a telecommunications card enabling connection to the server by a network, the server being provided with telecommunication means and memorization means of sufficient capacity to store the communications protocol, the operating system of the terminals recopied into an image file, its own operating system, and the applications programs, wherein the method enables remote loading of a startup program, by transforming the first interruption produced by a terminal following its being powered up into a request for reading an image file memorized in the server.

In another feature, the step of remote booting of the startup program consists of loading the startup (BOOT) sector into the volatile memory RAM, starting the execution of this startup file, transforming the interruptions requesting access to files of nonexistent magnetic peripherals of the terminal into requests for reading the corresponding image file in the server, by a procedure of coordinate transformation.

In another feature, the procedure of coordinate transformation consists of transforming the coordinates of physical sectors of the files of the magnetic peripherals into a logical chapter numbering of the image file corresponding to the sector of the file called by a sector correspondence table, transmitting to the server the chapter reading request, and sending the chapters of the image files to the terminal.

In another feature, the volatile memory RAM of the terminal, after the first remote booting of the startup program, contains a file allocation table (FAT) establishing a correspondence among the diskette number, the head number, the track number, the track sector number, and the file name, and a sector description table (SDT) establishing a correspondence among the diskette number, the track number, the track sector number, and the chapter number of the image file of the server.

In another characteristic, the program for transformation of the interruptions (EMUL INT) is memorized in a nonvolatile memory (PROM) of the telecommunications card.

In another characteristic, the method enables the remote loading of files of the operating system, constituted by the IO.SYS, MSDOS.SYS, CONFIG.SYS and COMMAND.COM files.

In another characteristic, the file allocation table (FAT) is memorized with eternal status (KEEP FOREVER) in the random access memory RAM, this status indicating by one bit of the word the state of the sector description card.

Another object is to provide a method for remote booting of a plurality of terminals that limits the waiting time of the terminals.

This object is attained in that when a terminal sends a request for a first chapter to the server, the server waits for a period of time T1 before replying, to assure that other terminals will not be having the same request.

In another characteristic, a request for a first chapter by another station arriving before a period of time T2 following the request for the same first chapter by a first station has elapsed is accepted immediately, and the procedure of remote booting of all the stations having sent the requests is reset to 0 for these stations.

In another feature, the server closes the session at the end of a time T3 between the transmission of each chapter and a time T5 between each frame transmission.

In another feature, the server transmits an end of boot frame at a time T4 after the transmission of an end of chapter frame, without any other station having sent a request.

In another feature, the times T1–T5 are parametrizable.

Another object of the invention is to propose a remote booting method which after the end of remote booting of a first operating system set can also remote boot various applications, either on request of the terminal or by multi-addressing (multicasting).

This object is attained in that the method includes a step of sending specific data frames to the chapters that include the Ethernet address of the receiving stations.

Another object is to permit access to the file loaded into the terminal and for nonexistent files to enable their remote booting.

This object is attained in that the terminal, when executing an instruction to open a file, reads the file allocation table; thus determines the sector and then reads the sector description table to determine the chapter to be looked for, executes the chapter, if the chapter resides in the executable RAM and; sends a request for remote booting to the server, if the chapter is absent.

In another feature, the sector description table includes a state byte indicating by one bit thereof the reception of the chapter, by another bit thereof its use by a third bit thereof the status "KEEP FOREVER", by a fourth bit thereof the number of the segment, by a fifth bit the presence of a fill value, and by a sixth bit a data-specific sector.

In another feature, the terminal includes a state register for the emulated interruption function, which in the case of the reception of an end of remote boot frame makes it possible to determine, by reading registers DL and AL of the microprocessor (213) of the terminal, whether it is necessary to perform a "load data segment" function or a "shutdown" function.

BRIEF DESCRIPTION OF THE DRAWING

Further characteristics and advantages of the present invention will become more apparent from reading the ensuing description, taken in conjunction with the accompanying drawings, in which.

DETAILED DESCRIPTION OF THE PREFERRED EMBODIMENT

Figure 1:
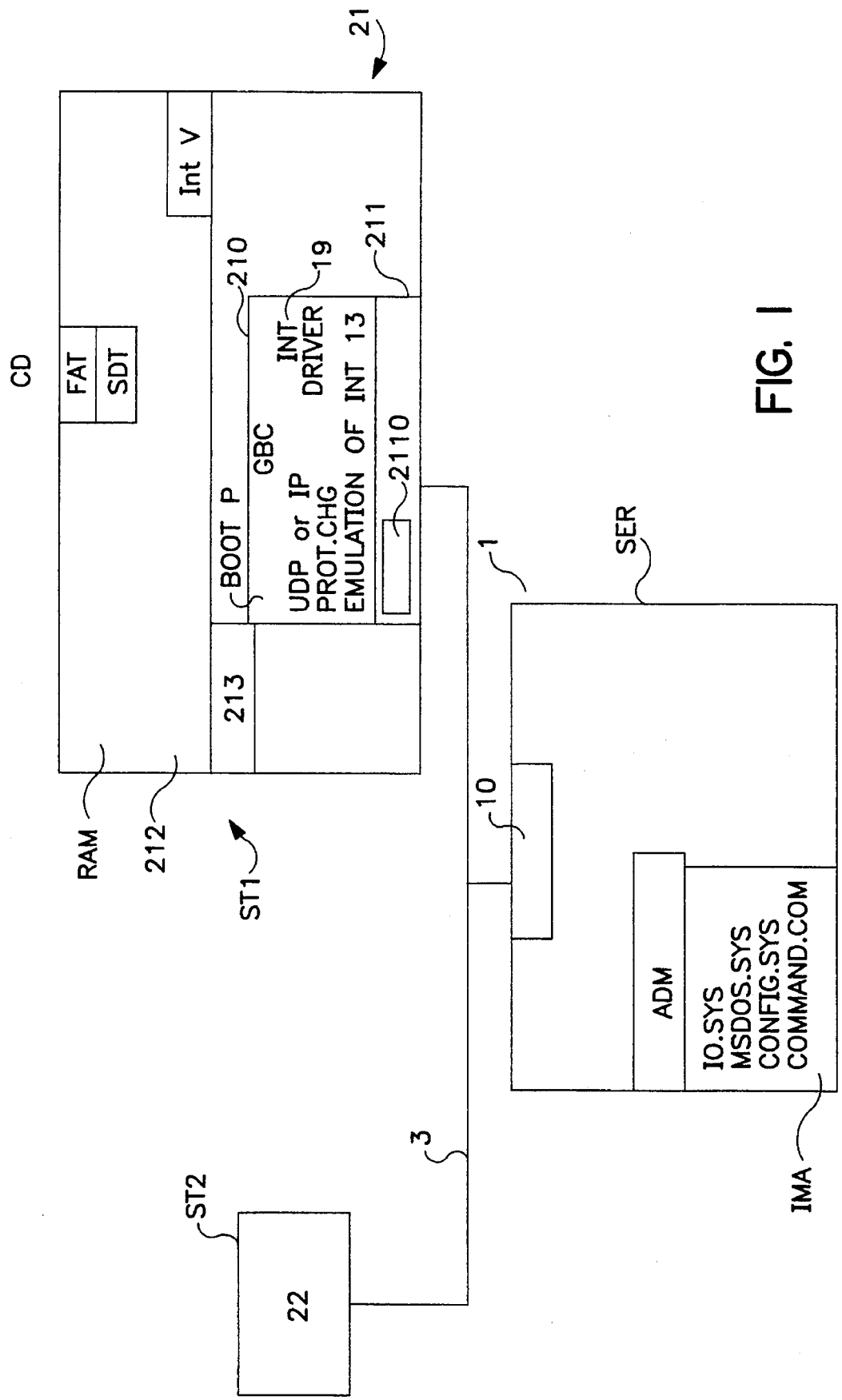
FIG. 1 is a schematic view of the entire network enabling the employment of the remote booting method.

FIG. 1 shows a server (1) connected by a telecommunications card (10) to an Ethernet network (3) and through this Ethernet network (3) to at least one first (ST1) and second (ST2) terminal. Each terminal ST1 (21), ST2 (22) is constituted identically by an Ethernet communications card (211), which includes a processor (2110) and a PROM for managing the processor package. This PROM includes not only the package management program but also either a program UDP for establishing multiaddress connections with the server, or a program (IP) for establishing single-address connection with the server. The PROM also contains an interruption emulation program 13 and an interruption program 19. The card communicates with the bus of the terminal. The terminal itself includes a microprocessor (213) and a random access memory RAM (212) with a capacity of at least 1 Mb, connected to the microprocessor by the bus. The microprocessor (213) communicates with the telecommunications card (211) by the bus, and the initialization program contained in the read-only memory (ROM) of the station, upon a reinitialization, makes it possible to generate an interruption (19), which is emulated by the program stored in the PROM (2110). This emulation makes it possible to establish a connection with the server, with the aid of the programs UDP or IP. The PROM (210) also contains a remote boot protocol (PROT.CHG) and a driver NDIS. As soon as this station is powered up, the interruption emulation program (19) brings about the transmission of a frame to the server by the communications protocol UDP or IP, and the server remote boot protocol PROT.CHG replies to this frame by transmitting the file allocation tables (FAT) and sector description tables (SDT) which are stored in the cache diskette CD of the random access memory RAM (212). After this transfer and after the server has sent a program BOOT for initializing the station, the station executes this program, and as soon as it encounters a request to read a nonexistent file in its RAM (212), it generates an interruption to request access to the magnetic peripherals that are nonexistent at that station. This request for access to the magnetic peripherals causes the execution of an emulation program, which brings about the establishment of a link with the server (1) by requesting the server to send a chapter corresponding to the name of the file the opening of which has been requested. The file allocation table (FAT) makes it possible to establish a correspondence between the file name diskette number the head number, the track number, and the track sector number where the file is located, at a station that has a diskette or disk, and the table (SDT) makes it possible to establish a correspondence between the sector number and the chapter number to be requested from the server. Following this request, the server administrator program (ADM), in an image file (IMA), prepares the chapter requested by the station. In FIG. 1, the image file includes the MS-DOS operating system files, which are constituted by the IO.SYS, MS-DOS.SYS, CONFIG.SYS, and COMMAND.COM files. Each time the MS-DOS operating system is executed, the station will request the opening of the files necessary for its function, and this file opening will bring about a chapter request until all the files necessary for system function have been loaded, to enable normal function of the terminal. At that moment, the system configuration, assuming that only the terminal ST1 is in operation, corresponds to that shown in FIG. 3, in which it can be seen that the volatile memory (212) has been loaded with the IO.SYS, MS-DOS.SYS, CONFIG.SYS, COMMAND.COM and NETFLOP.DOS programs, this last program being intended to handle the management of the communications card in such a way as to optionally permit later remote booting in response to specific sector or chapter requests. The remote booting protocol employed is shown in further detail in FIG. 2, in which it can be seen that the station (1) sends an initializing request (BD), to which the server responds with a "BOOT REPLY" message (BR). Following that response, the station sends the chapter request, in this case for the first chapter, by sending a "start chapter 1" (SC1) frame, to which the server responds by the request (ARPD) for the Ethernet address, in the case of a multi-addressing communication, and the station furnishes this information by the response (ARPR). Following that response, the server sends a sector description table frame for chapter 1 (SDTC1), and then at the end of a time T5 sends the data of chapter 1 (DC1), which may be sent in a plurality of frames, always with an interval of time T5 between each frame. The server waits for a period of time T1 between the "start chapter 1" (SC1) message requesting starting of remote booting and the response message requesting the address. This time interval enables other stations, whose startup took place concomitantly, also to send their "start chapter 1" (SC1) messages, resulting in immediate acceptance by the server. At the end of transmission of chapter 1, the station, if it finds an error, sends an error message SDTE relating to a portion of chapter 1, and in that case the server resends the frame SDT of chapter 1 (SDTC1) and the specific data for that chapter (SDC1) that have not been received. At the end, the server sends an "end chapter 1" frame (EC1), and the station executes this chapter 1 received, in order in the course of execution to discover whether the file corresponding to the chapter received requires calling up another file. That triggers a request for another chapter n via a "start chapter n" frame SCn. When it receives this request, the server waits for a period of time T3 before sending the frame SDTCn constituting the sector description table of the chapter n and the frame DCn for the data of this chapter. As before, if the station sends an error frame relating to the chapter n (SDTECn), the server will send the frame of the sector description table of the chapter (SDTCn) and the specific data for this chapter SDCn that were not received properly. Once the station receives the end of chapter frame (ECn), the chapter received is executed, and if there is any error in the data, a data error frame for chapter n (DECn) is sent, in order to obtain the transmission of a data frame for chapter n (DCn) on the part of the server. Once again, transmission is completed by an end frame for chapter n (Cn). The server then waits for a period of time T4, during which, if it receives no complementary request, it sends an "end remote boot" frame (ERB). In the case where the server is connected to a plurality of stations, and when a second station 2 ST2 sends a chapter 1 request SC1 by connecting itself to the network during a time interval T2 following the connection of a first station, the request of this second station is immediately accepted, by cancelling the procedure of remote booting the first station and beginning the procedure again from 0 for both stations. This procedure makes it unnecessary to have to wait for the end of remote booting of one station 1 to remote boot a station 1, or again to avoid having a memory at the server level that manages the chapters that have not been received in order at the end of remote booting to request the remaining chapters to be received, as in the case of U.S. Pat. No. 4,958,278 discussed above.

Figure 2:
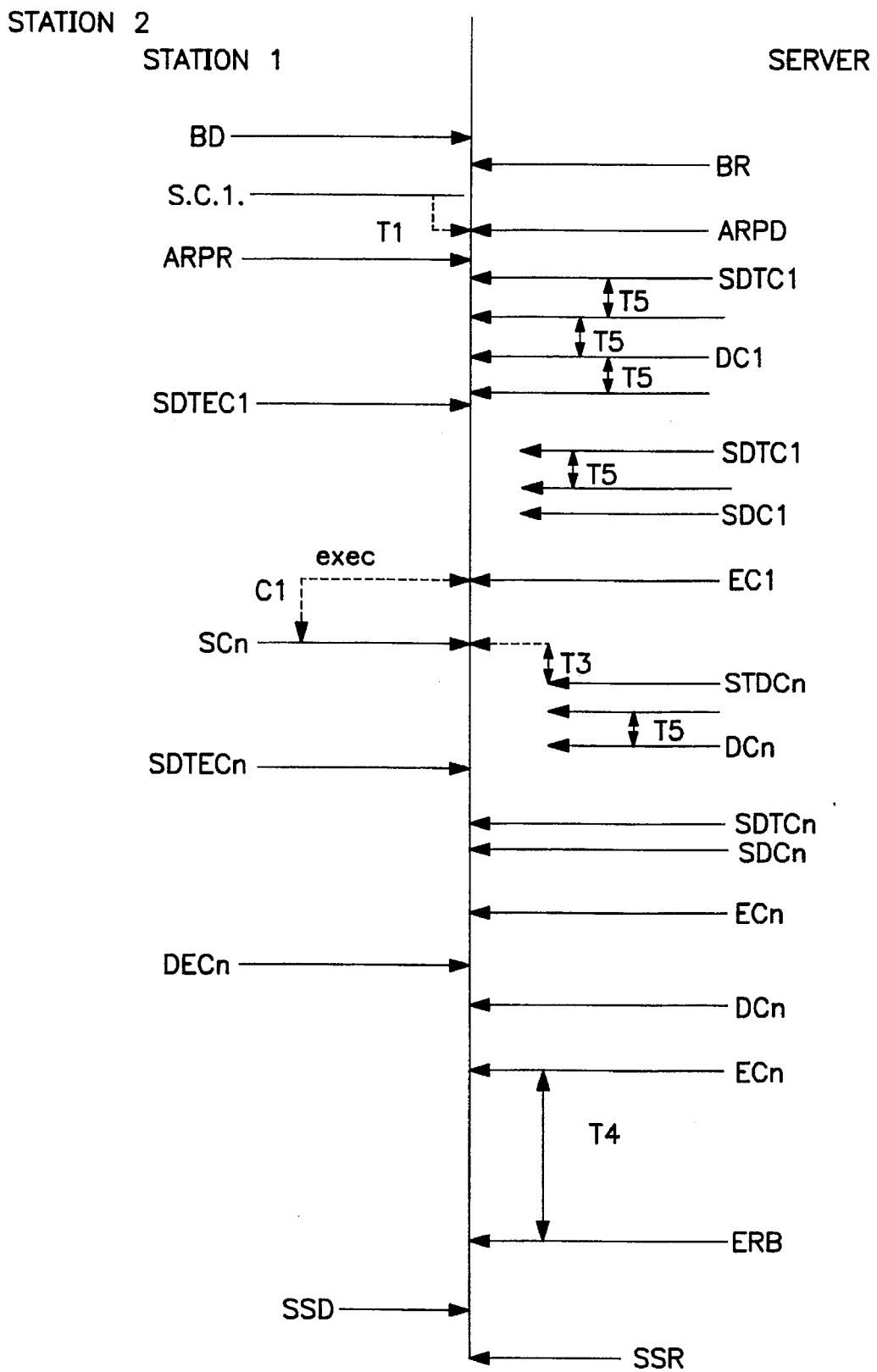
FIG. 2 is a schematic illustration of the timing diagram of the exchange between the server and one or more stations.

Each frame sent in the course of the remote booting sequence shown in FIG. 2 has a specific configuration corresponding to that shown in Tables 1–3. Hence the "start chapter" frame (SC), by its first two bytes, makes it possible to indicate the frame type and to let the server know that this is a "start chapter" frame, requesting the transmission of a chapter; by the next 12 bytes, to define the name of the volume in which the chapter to be sent is located, and by the next two bytes to define the identifier, that is the number of the chapter in ASCII code; and by the next two words to define the Ethernet address (IP station) of the station.

In the discussion that follows, information that is identical and has the same format in the other frames will not be described again.

The sector description table frame SDTC of the chapter also contains the following information: type of frames, name of the volume, identifier, the information defining the mask of the frame formed at one byte and indicating, with the bits A1, the frame number pertaining to this formation SDTC. A supplementary byte defines the maximum mask of the frame, by setting all the bits to "1"; the next two bytes define the first data segment, and the next two other bytes define the second data segment, if any. Two supplementary bytes define the shift location where the next cards in the sector description table will be implanted, and two supplementary bytes define the number of following cards. The cards are defined in eight bytes each and, as shown by the SDC card, have the sector number in two bytes, the pseudonym of the sector in two other bytes, the shift in the diskette cache in the next two bytes, the fill value in one byte, and the state of the card in another byte, defined by the bit 7 at "1", the logical value to indicate that the sector has been received, the bit 6 at "1" to indicate that the sector has been used, the bit 5 at "1" to indicate that the sector should be kept forever, the bit 4 at "1" to indicate the segment number, the bit 3 at "1" to indicate a fill value, and the bit 0 at "1" to indicate the data specific to the sector.

The SDT error frame (SDTE), like the following frames, is constituted by information on the type of frame, volume name, identifier, Ethernet address of the station, and the mask of the frame SDTC. The specific data chapter frame (SDC) also includes the information, frame type, volume name, identifier, shift of the first card, shift of the tenth card, an Ethernet address in six bytes defining the address of the station, and the data to be sent, in 512 to 1024 bytes.

The data error frame (DE) also includes the frame type, the volume name, the identifier, information over two bytes indicating the number of missing sectors, and in two other bytes, for each missing sector, the number of the missing sector.

The end of chapter frame EC and the end remote boot frame (ERB) include the frame type and the volume name.

The specific sector request frame SSD also includes the frame type, the volume name, the identifier, and the number of the specific sector requested in two bytes.

The frame SSR, in addition to the above information, includes the data in 512 bytes. The interruption emulation program, by way of the status register of the emulated functions, modifies the information contained in the registers of the processor (213) of the station in accordance with the following table:

| | | |
|---|---|---|
| 0 | reset | reset the "carry" flag (NY) to 0 |
| 1 | disk_status | samples the diskette status ("read" function) and reset carry (NY) |
| 2 | read | see description above |
| 3 | write | return "write protect" code and carry error (CY) |
| 4 | verify | reset carry (NY) |
| 5 | format | set carry error (CY) |
| 8 | parameters | sample the diskette parameters and reset carry (NY) |
| d | special | special remote boot features. (see "status of TCHG after receiving end_remote_boot - with NETFLOP") - with registers DL = 0, AL = 0, this involves the "change data segment" function between the PROM and NETFLOP - with registers DL = 0, AL = 1, it involves the function of shutting down the PROM, or "shutdown". |
| 15 | read_dasd | return code "change_line avail." and reset carry (NY) |
| 16 | change_line | return code "not active" and reset carry (NY) |
| 17 | set_dasd | return code "OK" and reset carry (NY) |
| 18 | set_media | return code "write protect" and carry error (CY) |

All the other function codes return a return code 01.

Hence it can be confirmed that in the case of the special function represented by the code including between 9 and 15, the registers DL and AL of the microprocessor are to be loaded with logic values that will indicate either a change of segment or the function of PROM shutdown. The other functions emulated make it possible to modify the bits (CY) and (NY) of the state register of the microprocessor.

Figure 3:
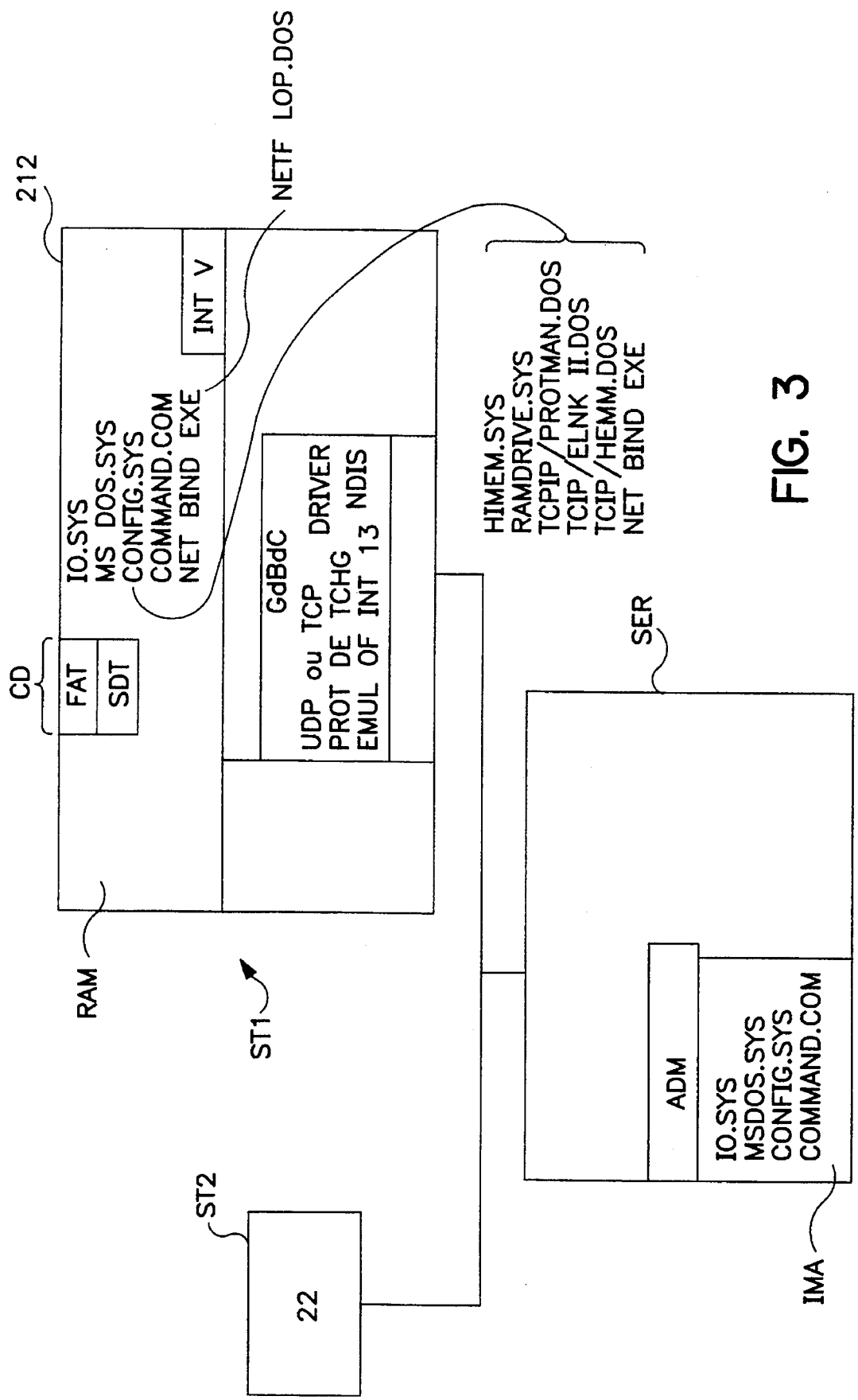
FIG. 3 is a schematic view showing the state of the network after loading of the operating system.

When the CONFIG.SYS file shown in FIG. 3, containing the PROTMAN.DOS, ELNKII.DOS, NEMM.DOS and TCPDRV.DOS files, which respectively assure the functions of protocol management, card driver, memory management, and resident portion of the communications program, have been loaded and when the entire operating system as well as the NETBIND.EXE program have been loaded, the server sends an "end remote boot" frame (ERB), by which it indicates to the PROM that all the programs have been loaded, and the remote boot protocol contained in the PROM terminates this remote booting by several actions, which consist of starting the execution of the NETBIND program which uses the program ELNKII.DOS to access the network; this program NETBIND starts the execution of NETFLOP, which enables loading the data segment and recovering the context of the stoppage managed by the PROM. NETFLOP also brings about a normal shutdown of the PROM, with reset of the network card and restoration of the IRQ5 vector to the old BIOS vector, and deinstallation of the manager of the programmable timeouts of the remote booting process. This shutdown causes the management of the interruptions, and in particular of the interruption, to change over from the PROM to the NETFLOP program. This new management makes it possible to have a parametrizable behavior different from that fixedly defined by the PROM. The management of the emulation by the PROM is valid as long as the shutdown has not been done. After the shutdown, the interruption 13 of the PROM calls on either the interruption vector of NETFLOP or the old BIOS vector. This shutdown is done by executing the following sequence, written for a microprocessor (213) of the Intel 386 or 486 type, and its transposition to other microprocessors is within the competence of those skilled in the art.

| Floppy | proc | near |
|---|---|---|
| | push | ds - send data segment ds to the register stack |
| | push | ax - send registers AH and A1 constituting ax to the stack |
| | xor | ax, ax - exclusive-or for ax |
| | mov | ds, ax, moving ax —> dx |
| | mov | ax, word ptr ds:[4a2h] - moving the contents from the address determined by the contents of ds + 4a2h to ax |
| | mov | ds, ax - moving ax to ds |
| | cmp | di, 0 - comparison of the register di with the value 0 |
| | pop | ax extraction from the register ax |
| | jne | not_ours if di is not equal to zf = 0 skip to label "not ours" |
| | cmp | ah, 19h comparison of 19h with the high portion of ax |
| | jae | not_ours skip to "not ours" if ah above 19h => CP = 0 |
| | test | boot_state, SHUTDOWN |
| | jnz | another_story skip to "another story" if not equal to 0 +> zf = 0 (if boot state = SHUTDOWN) |
| | push | es - send to the stack of register es |
| | pusha | save the eight general registers in the stack |
| | mov | bp, sp - move SP —> BP |
| | mov | si, ax - move AX _> SI |

| Floppy | proc | near |
|---|---|---|
| | shr | si, 8 - shift logical right by 8; get rid of al |
| | shl | si, 1 - shift to the left by 1; |
| | call | cs:dispatch[si]-calling the contexts of dispatch indexed by si |
| | call | store_status - routine store-status call |
| | popa | extraction of the eight general registers from the stack |
| | pop | es - extraction from the register es |
| | pop | ds - extraction of the data segment from the register |
| | iret | return form interrupt |
| not_ours: | | |
| | pushf | send flags to the stack |
| | call | dword ptr save_13; old vector (BIOS) |
| | pop | ds - data segment extraction |
| | retf | 2      ; because of carry flag |
| another_story: | | |
| | pushf | |
| | call | dword ptr new_it_13; netflop vector |
| | pop | ds |
| | retf | 2      ; because of carry flag |
| floppy endp | | |

The management of INT13 by NETFLOP calls on tkhe parameters "KEEP FLOPPY" and "KEEP CACHE" stated in a protocol point INI file, which as a function of their states bring about the following function:

| KEEPCACHE = YES | |
|---|---|
| KEEPFLOPPY = YES | |
| - INIT13h | Looks for the sector in the diskette cache. |

If the sector is not there or is no longer there, a "specific sector" request is generated to the server TCHG. The server directly accesses the diskette (the one whose FAT and main directory have been sent to the station must imperatively be inserted into the server reader) and replies to the station with a "specific sector reply" (SSR) frame addressed by Ethernet multicasting but including, in the protocol portion of the TCHG, the address IP of the addressee station. The stations filter this field on receiving such a frame.

Accordingly, a miniature file management remains available for the station, after the end of remote booting.

| KEEPCACHE = YES | |
|---|---|
| KEEPFLOPPY = NOS | |
| - INIT13h | Looks for the sector in the diskette cache. |

If the sector is not there or is no longer there, a "sector inaccessible for reading" code is sent to the system.

The cache remains active in memory.

KEEPCACHE=NOS
KEEPFLOPPY=YES

A "specific sector" request is generated to the server TCHG. The server directly accesses the diskette (the one whose FAT and main directory have been sent to the station must imperatively be inserted into the server reader) and replies to the station with a "specific sector reply" frame addressed by Ethernet multicasting but including, in the protocol portion of the TCHG, the address IP of the addressee station. The stations filter this field on receiving such a frame.

Accordingly, a miniature file management remains available for the station, after the end of remote booting. (See performance, constraints linked with changing the diskette).

The cache is inactive, thus freeing the memory for the applications.

KEEPCACHE=NO
KEEPFLOPPY=NO
INIT13h A return code "sector inaccessible for reading" is sent to the system.

The cache is inactive, thus freeing the memory for the applications.

The "KEEPCACHE=YES" parameter assumes that the memory range used by the CACHE does not threaten to conflict with a DOS application.

EXAMPLE

If the choice of the segment CACHE is 7000H, an application using this segment will overwrite the data of the cache, presenting a very major risk of system blockage.

Conversely, the segments 0D000h remain available for the cache at any moment whatever (outside any use of paginated memory managers (EMS) certainly using this same memory range).

Note: the segments 0D000h and/or 0E000h, if they are used, are not freed after the "end_remote_boot" has been received; that is, specifically:

upon reception of the SDT of chapter 1, after recognition of the job segments 0D000h and/or 0E000h, these same segments are validated.

upon reception of "end remote boot" these segments are not invalidated.

Further modifications within the competence of one skilled in the art are also part of the spirit of the invention.

TABLE 1

SC - start chapter

| | | |
|---|---|---|
| type of frame | 2 bytes | 000h |
| Volume Name | 12 bytes | |
| identifier | 2 bytes | Chapter number in ASCII (01 for the first one) |
| IP Station | 2 words | |
| SDT Chapter | | |
| type of frame | 2 bytes | 100h |
| Volume name | 12 " | |
| identifier | 2 " | Chapter number in ASCII |
| SDT Chapter frame mask | 1 " | 1 bit set per frame |
| SDT Chapter max frame mask | 1 " | all the settable bits set |
| First data segment | 2 " | |
| Second data segment | 2 " | 0 if none |
| Offset in SDT the following cards are to be put in | 2 " | |
| Number of following cards | 2 " | |
| cards | 8 " | each SDC |
| SDC Sector Description Card | | |
| Sector number | 2 bytes | |
| Sector alias | 2 " | (0 if none) |
| Offset | 2 " | offset in floppy cache (segment indicated by segment number bit) |
| Filling value | 1 byte | |
| Status | 8 bits | |
| 7 6 5 4 3 2 1 0 | | |
| X--------------- | received | |
| --X------------- | used | |
| ----X----------- | Keep forever | |
| ------X--------- | Segment number | |

TABLE 1-continued

| | | |
|---|---|---|
| --------X-------- | Filling value | |
| ----------------X | specifique Data sector (used by server program, not transmitted) | |

TABLE 2

SDT Error

| | | |
|---|---|---|
| Type of frame | 2 bytes | 200h |
| Volume name | 12 bytes | |
| identifier | 2 bytes | |
| IP Station | 2 words | |
| SDT chapter | 1 byte | |
| frame mask | | |
| SDC - Specific data chapter | | |
| type of frame | 2 bytes | 401h |
| Volume name | 12 bytes | |
| identifier | 2 bytes | Chapter number in ASCII |
| offset of 1st SDT card | 2 bytes | |
| offset of 2nd SDT card | 2 bytes | (0 if none) |
| Ethernet address | 6 bytes | |
| data | 512 ou 1024 bytes | |
| DE - Data Error | | |
| type of frame | 2 bytes | 800h |
| Volume name | 12 bytes | |
| identifier | 2 bytes | Chapter number in ASCII |
| number of sectors missing | 2 bytes | |
| Sectors numbers | 2 bytes | for each sector |
| EC - End Chapter | | |
| type of frame | 2 bytes | 1000h |
| Volume name | 12 bytes | |
| identifier | 2 bytes | Chapter number in ASCII |

TABLE 3

ERB - End Remote Boot

| | | |
|---|---|---|
| type of frame | 2 bytes | 2000h |
| Volume name | 12 bytes | |
| identifier | 2 bytes | Chapter number in ASCII |
| SSD Spécifique Sector Request | | |
| type of frame | 2 bytes | 4000h |
| Volume name | 12 bytes | |
| identifier | 2 bytes | Chapter number in ASCII |
| Sector number | 2 bytes | |
| SSR - Spécifique Sector Reply | | |
| type of frame | 2 bytes | 4001h |
| Volume name | 12 bytes | |
| identifier | 2 bytes | Chapter number in ASCII |
| Sector number | 2 bytes | |
| data | 512 bytes | |

We claim:

1. A method for remote booting by a server of at least one terminal, wherein said terminal includes a volatile memory, at least one processor, a telecommunications card enabling connection to the server by a network, said server being provided with telecommunication means and memory means of sufficient capacity to store a communications protocol, an operating system for the terminal stored in an image file, a server operating system, and applications programs, wherein said method comprises the steps of remote loading said terminal with a startup program, and transforming a first interruption produced by the terminal when the terminal is powered up into a request for reading the image file stored in the server;

wherein said step of remote loading said terminal with a startup program includes loading a file allocation table (FAT) into the volatile memory to define a diskette number, a head number, a track number, a track sector number, and a file name for said terminal files, and loading a sector description table (SDT) into the volatile memory to establish a correspondence between said terminal files and a diskette number, a track number, a track sector number, and chapter numbers of the image file of the server;

and further wherein the step of remote loading of the startup program comprises the steps of loading a startup (BOOT) sector into the volatile memory, starting the execution of said startup program, wherein the execution of said startup program includes file request interruptions for requesting access to nonexistent terminal files of nonexistent magnetic peripherals of the terminal, and transforming said file request interruptions into requests for reading a corresponding image file in the server; and said method further including the step of providing an emulation program for transformation of the file request interruptions, and storing said emulation program in a nonvolatile memory of the telecommunications card.

2. The method of claim 1, wherein the step of transforming said file request interruptions comprises the steps of transforming coordinates of physical sectors of the nonexistent terminal files on the nonexistent magnetic peripherals into logical chapter numbers of the image file, transmitting to the server a request by the terminal to read chapters corresponding to the chapter numbers, and sending the requested chapters of the image file to the terminal.

3. The method of claim 1, further including the step of enabling the remote loading of files of the terminal operating system, wherein said terminal operating system files include IO.SYS, MSDOS.SYS, CONFIG.SYS and COMMAND.COM files.

4. The method of claim 1, wherein the step of loading the file allocation table (FAT) includes storing the file allocation table with eternal status in the random access memory, said eternal status being indicated by one bit of a word in the sector description table.

5. The method of claim 1, further including the steps of establishing time periods T1, T2, T3, T4, and T5 for effecting operation of the server and using a manager process to manage said time periods, wherein at least a first and second terminal are connected to the server, and further wherein the step of transmitting a reading request for a first chapter to the server, includes causing the server to wait for time period T1 before sending the requested first chapter, and checking if the second terminal transmits the same request during time period T1.

6. The method of claim 5, wherein if said second terminal sends a request for a first chapter during time period T1 and before time period T2 following the request for the same first chapter by the first station, restarting the procedure of remote booting of the first and second terminals.

7. The method of claim 5, further including the step of causing the server to wait for time period T3 between the sending of chapters and time period T5 between frame transmissions which together define the chapters.

8. The method of claim 5, further including the step of causing the server to close a session at the end of time period T4 after sending an end of chapter frame, if no other station has sent a request.

9. The method of claim 5, further including the step of selectively setting the length of each of said time periods T1, T2, T3, T4 and T5.

10. The method of claim 1, further including the step of sending chapter-specific data frames which include an Ethernet address of a receiving terminal.

11. The method of claim 1, further including the steps of causing the terminal, when executing an instruction to open a file, to read the file allocation table, thus determining a sector, reading the sector description table to determine a chapter, executing the chapter if the chapter resides in the volatile memory, and sending a request for remote loading to the server if the chapter is not in the volatile memory.

12. The method of claim 11, wherein the sector description table includes a state byte, and further including the step of indicating by a first bit of the state byte, reception of a chapter, by a second bit use of a chapter, by a third bit of the state byte, a eternal status, by a fourth bit of the state byte, a number of segments, by a fifth bit of the state byte, presence of a fill value, and by a sixth bit of the state byte, a data-specific sector.

13. The method of claim 1, wherein the terminal includes a state register for an emulated interruption function, and further including the step of using said state register at a reception of an end of remote boot frame to determine, by reading registers DL and AL of the processor of the terminal, whether it is necessary to perform a "load data segment" function or a "shutdown" function.

\* \* \* \* \*